(12) United States Patent
Brenner et al.

(10) Patent No.: US 11,075,424 B2
(45) Date of Patent: Jul. 27, 2021

(54) FIXATION OF ELECTROCHEMICAL CELLS IN A HOUSING OF A BATTERY MODULE

(71) Applicant: Clarios Advanced Solutions GmbH, Hannover (DE)

(72) Inventors: Helge Brenner, Hannover (DE); Markus Hoh, Wunstorf (DE); Ralf Joswig, Buchholz (DE)

(73) Assignee: Clarios Advanced Solutions GmbH, Hannover (DE)

( * ) Notice: Subject to any disclaimer, the term of this patent is extended or adjusted under 35 U.S.C. 154(b) by 0 days.

(21) Appl. No.: 16/081,857

(22) PCT Filed: Mar. 3, 2017

(86) PCT No.: PCT/EP2017/055076
§ 371 (c)(1),
(2) Date: Aug. 31, 2018

(87) PCT Pub. No.: WO2017/149146
PCT Pub. Date: Sep. 8, 2017

(65) Prior Publication Data
US 2019/0013502 A1    Jan. 10, 2019

(30) Foreign Application Priority Data
Mar. 3, 2016   (DE) .......................... 102016103841.5

(51) Int. Cl.
*H01M 50/20* (2021.01)
*H01M 10/04* (2006.01)
(Continued)

(52) U.S. Cl.
CPC ............... *H01M 50/20* (2021.01); *B60K 6/28* (2013.01); *B60L 50/64* (2019.02);
(Continued)

(58) Field of Classification Search
CPC .. H01M 2/1016; H01M 2/1077; H01M 50/20; H01M 50/24; B60L 50/64; B60K 6/28
See application file for complete search history.

(56) References Cited

U.S. PATENT DOCUMENTS 5,830,598 A    11/1998  Patterson
5,931,688 A *   8/1999  Hasz .................... H01R 13/748
                                                          439/247
(Continued)

FOREIGN PATENT DOCUMENTS

CN    102683621 A    9/2012
CN    103999258      8/2014
(Continued)

OTHER PUBLICATIONS

International Search Report and Written Opinion for PCT/EP2017/055076 dated Apr. 12, 2017. 13 pages.
(Continued)

*Primary Examiner* — Matthew J Merkling
(74) *Attorney, Agent, or Firm* — Boardman & Clark LLP

(57) ABSTRACT

A battery module includes a housing and a base of the housing. The base includes at least two opposing partition support walls, a first external wall, and a second external wall that is substantially perpendicular to the first external wall. The base also includes two or more partitions extending between the at least two opposing partition support walls to define compartments within the base, wherein each of the two or more partitions extend in alignment with the first external wall and transverse to the second external wall. Further, each of the two or more partitions is coupled to at least one of the at least two opposing partition support walls via a corresponding movable connection configured to be
(Continued)

movable between a first position angled away from the first external wall, and a second position angled toward the first external wall.

14 Claims, 10 Drawing Sheets

(51) Int. Cl.
  *B60L 50/64* (2019.01)
  *H01M 50/24* (2021.01)
  *B60K 6/28* (2007.10)

(52) U.S. Cl.
  CPC ....... *H01M 10/0481* (2013.01); *H01M 50/24* (2021.01); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | | |
|---|---|---|---|
| 6,641,951 B1 | 11/2003 | Vutetakis et al. | |
| 2003/0071039 A1 | 4/2003 | Spykerman | |
| 2011/0065331 A1* | 3/2011 | Takagi | H01R 13/113 439/733.1 |
| 2012/0088143 A1 | 4/2012 | Lietz et al. | |
| 2013/0108901 A1* | 5/2013 | Schaefer | H01M 2/1016 429/62 |
| 2013/0309537 A1 | 11/2013 | Zhao | |
| 2014/0186669 A1 | 7/2014 | Obasih et al. | |
| 2014/0186683 A1 | 7/2014 | Tyler et al. | |
| 2014/0325831 A1 | 11/2014 | Brisbane | |
| 2014/0370363 A1* | 12/2014 | Oshiba | H01M 10/625 429/151 |
| 2015/0037541 A1 | 2/2015 | Pinon | |
| 2015/0093982 A1* | 4/2015 | Bailey | H01M 2/1077 454/184 |
| 2017/0133642 A1* | 5/2017 | Lee | H01M 2/20 |

FOREIGN PATENT DOCUMENTS

| | | |
|---|---|---|
| CN | 104685664 | 6/2015 |
| JP | 2012069408 A | 4/2012 |
| JP | 2012248374 | 12/2012 |
| WO | 2014128841 A1 | 8/2014 |

OTHER PUBLICATIONS

Machine Translation of CN102683621A.
Machine Translation of CN103999258A.
Machine Translation of CN104685664A.
Machine Translation of JP2012069408A.

\* cited by examiner

FIXATION OF ELECTROCHEMICAL CELLS IN A HOUSING OF A BATTERY MODULE

BACKGROUND

The present disclosure relates generally to the field of batteries and battery modules. More specifically, the present disclosure relates to a system and method for disposing or retaining electrochemical cells and other components in a housing of a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, electrochemical cells may be loosely retained in a housing of a battery module, or electrochemical cells may be fixed in the housing via complicated systems that involve elaborate manufacturing processes. Accordingly, it is now recognized that improved retention of electrochemical cells in a battery module is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module having a housing and a base of the housing. The base includes at least two opposing partition support walls, a first external wall, and a second external wall that is substantially perpendicular to the first external wall. The base also includes two or more partitions extending between the at least two opposing partition support walls to define compartments within the base, wherein each of the two or more partitions extend in alignment with the first external wall and transverse to the second external wall. Further, each of the two or more partitions is coupled to at least one of the at least two opposing partition support walls via a corresponding movable connection configured to be movable between a first position angled away from the first external wall to facilitate access to a corresponding one of the compartments, and a second position angled toward the first external wall to facilitate retention of an electrochemical cell disposed within the corresponding compartment.

The present disclosure also relates to a housing of a battery module. The housing includes a base having a first wall, a second wall opposite to the first wall, and partitions extending between the first wall and the second wall and defining compartments within the base. The compartments are configured to receive electrochemical cells, where each partition is coupled to at least one of the first wall or the second wall via a flexible connection movable between an open position that facilitates a first total volume of the compartments defined by the partitions, and a compressed position that facilitates a second total volume of the compartments, where the second total volume is smaller than the first total volume.

The present disclosure also relates to a method of assembling a battery module. The method includes disposing movable connections of corresponding partitions of a housing of the battery module in a first position to facilitate a first size of compartments within the housing and defined by the corresponding partitions of the housing. The movable connections couple the corresponding partitions with at least one of two opposing side walls of the housing. Further, the method includes disposing electrochemical cells into the compartments. Further still, the method includes moving the movable connections of the corresponding partitions into a second position to facilitate a second size of the compartments defined by the corresponding partitions, where the second size of the compartments is smaller than the first size of the compartments.

DRAWINGS

Various aspects of this disclosure may be better understood upon reading the following detailed description and upon reference to the drawings in which.

DETAILED DESCRIPTION

Figure 1:
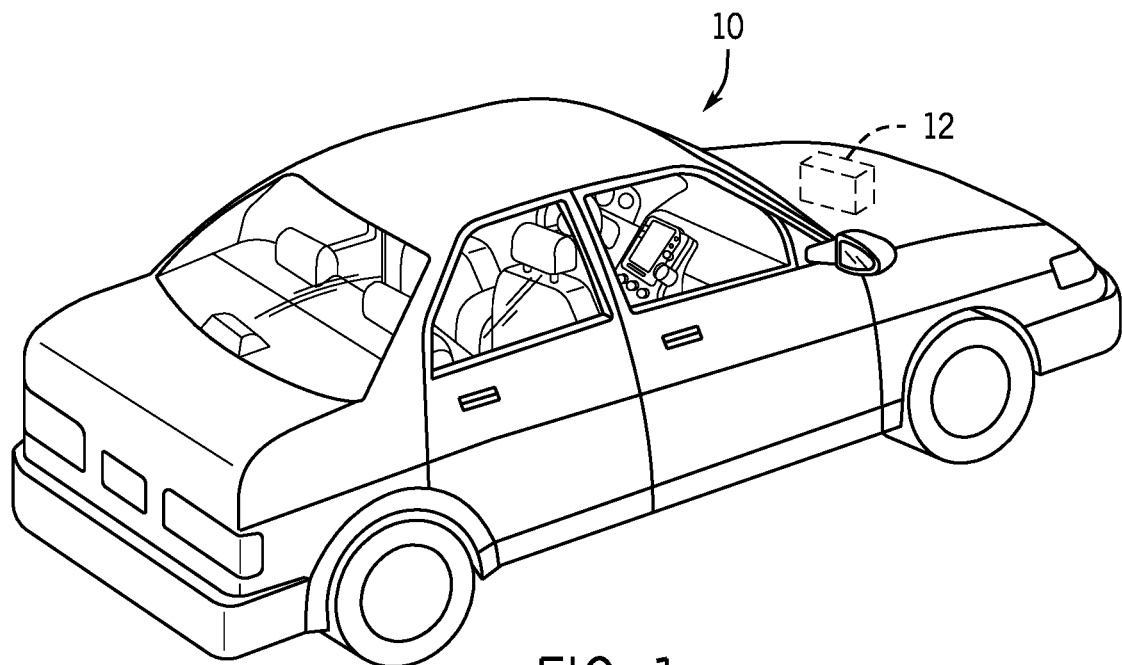
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing configured to receive electrochemical cells therein. For example, the electrochemical cells may be disposed into a base (e.g., lower base) of the housing. The base may have partitions (e.g., electrically insulative partitions) disposed therein and coupled with at least one of two opposing walls (and, in some embodiments, a central wall extending between, and parallel to, the opposing walls) of the lower base via flexible connections, where the partitions and corresponding flexible connections may be flexed (e.g., moved) toward a first direction (e.g., prior to insertion of the electrochemical cells into the lower base) to increase sizes of compartments defined between the partitions. Thus, each electrochemical cell may be more readily received by a corresponding one of the compartments while the flexible connections and partitions are in a first position (e.g., receiving position, open position) that facilitates a larger size of the compartments.

After disposing the electrochemical cells into the lower base of the housing, a carrier (e.g., plastic carrier) having several components related to electric coupling and electric transmission of the battery module may be placed over the electrochemical cells. The electrochemical cells, the partitions (e.g., about the flexible connections with the lower base), and the carrier may then be pushed toward a second direction opposite to the first direction, thereby compressing the electrochemical cells and the partitions into a smaller volume. In other words, the partitions and flexible connections may be compressed into a second position (e.g., compression position, retaining position), such that the electrochemical cells are retained by the compartments and the compartments include a smaller size compared to the larger sizes facilitated by the first position of the partitions and flexible connections described above. It should be noted that the components related to electric coupling and electric transmission of the battery module may be disposed on the carrier before or after disposing the carrier into the base of the housing of the battery module. It should also be noted that, in some embodiments, the electrochemical cells and the partitions and corresponding flexible connections may be compressed prior to insertion of the carrier, and that the carrier may be disposed over the electrochemical cells only after the compression described above.

In some embodiments, the partitions may be set (e.g., locked) into place in the second position after pushing the electrochemical cells and the partitions (e.g., about the flexible connections with the lower base) toward the second direction. For example, the partitions may include snap features or components (e.g., fixing features or components, locking features, members, or components, setting features or components) that cause the flexible connections to click or lock into place in the second position. Thus, each partition, once set or locked into place via the set or locked connection with the opposing wall(s) and/or central wall of lower base, may offer some structural rigidity between the electrochemical cells disposed on either side of the flexible partition, and further manufacturing steps may be taken while the electrochemical cells (or at least some of the electrochemical cells) are at least partially retained within the base of the housing. In some embodiments, retention features (e.g., snap features, clips) of the base, the carrier, or both may also cause the carrier to click (e.g., lock, set, or fix) into place at least with respect to the first and second directions (e.g., the carrier may still be movable in a third direction perpendicular to the first and second direction, as described below).

Further (e.g., next), the electrochemical cells (and, in some embodiments, the carrier) may be additionally compressed in the third direction perpendicular to the first and second directions described above. For example, the carrier may include members attached to the carrier that press into terminal ends (e.g., tops) of the electrochemical cells when the carrier is pressed downwardly in the third direction (e.g., as previously described, the carrier may be set in the second direction but may still be movable in the third direction). The members on the carrier may press the electrochemical cells into a thermal pad (e.g., a compliant, malleable, or ductile thermal pad) disposed in a bottom of the lower base of the housing (e.g., proximate to base ends of the electrochemical cells opposite to the terminal ends of the electrochemical cells). As described above, the electrochemical cells (or at least some of the electrochemical cells) may be at least partially retained by the flexible partitions set in place (e.g., in the second position) and/or by the carrier set into place at least with respect to the second direction (e.g., by the snap or click features).

Further still, materials of the carrier and the lower housing may be selected to enable welding of the carrier to the lower housing and to facilitate improved compression of the electrochemical cells. For example, the carrier may include transparent material (e.g., material through which a laser light passes without melting the material) and absorbent material (e.g., material which absorbs the laser light and melts), where the transparent and absorbent materials are strategically located throughout the carrier, as set forth below. It should be noted that, in certain embodiments, the transparent and absorbent materials may be identical or similar materials, but that the absorbent material may include a feature (e.g., a coating or layer of dark paint or material) that facilitates absorption.

Specifically, the carrier may mostly include transparent material that enables a laser light to pass therethrough without melting the transparent material. The laser light may be absorbed by the absorbent material of the lower housing, causing the absorbent material of the lower housing to melt, which facilitates welding of the lower housing to the transparent material of the carrier. However, portions of the carrier may also include absorbent material. For example, the carrier may include extensions that extend downwardly toward, and contact, the electrochemical cells. The extensions may be made of the absorbent material (e.g., the same absorbent material as the lower base, or a different type of absorbent material). In some embodiments, as described above, the absorbent material may be an identical or similar material as the transparent material, but may include a coating or layer of dark paint or material that facilitates absorption.

By including absorbent material in the extensions, the extensions may melt while absorbing the laser light. In conjunction with a downwardly force exerted against a top of the carrier, melting of the extensions may enable the carrier to move downwardly and to come into contact with surfaces of the housing that the carrier may be welded to. Further, the extensions may melt in such a way that facilitates intimate contact between the extensions and each of the electrochemical cells, which may otherwise not be possible if the electrochemical cells include slight differences in height. The extensions may then harden and maintain intimate proximity or contact with each of the electrochemical cells, facilitating improved fixation of the electrochemical cells within the lower base of the housing.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
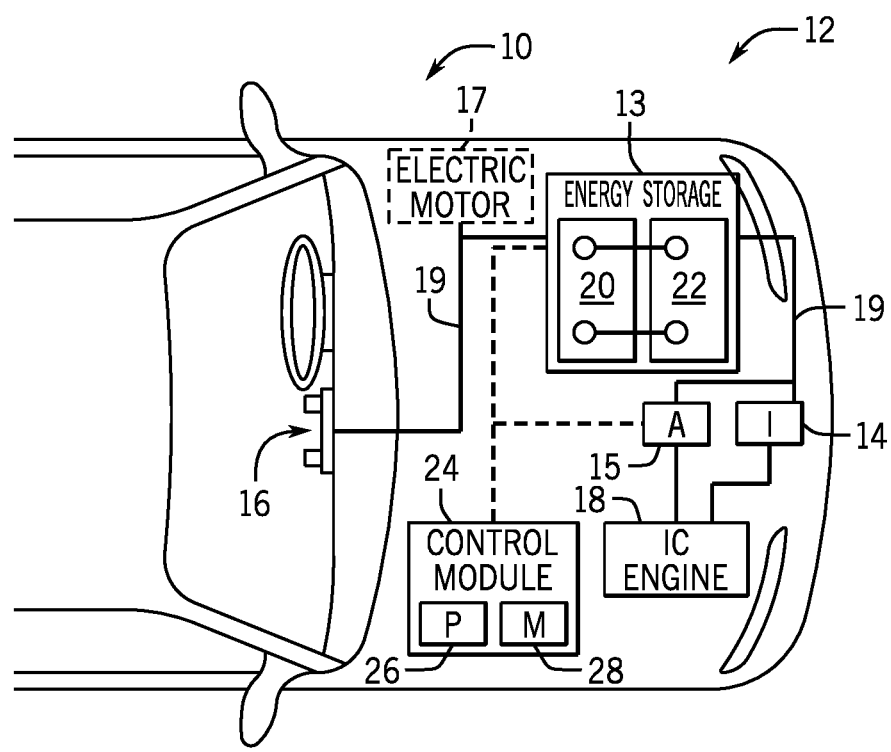
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

In accordance with an aspect of the present disclosure, the battery module 20 (e.g., lithium-ion battery module) may include a housing configured to receive a number of electrochemical cells, and to receive a carrier (e.g., a carrier of electric components) used to electrically connect terminals of the electrochemical cells and to compress the electrochemical cells into position with the housing. These and other features will be described in detail below with reference to later figures.

Figure 3:
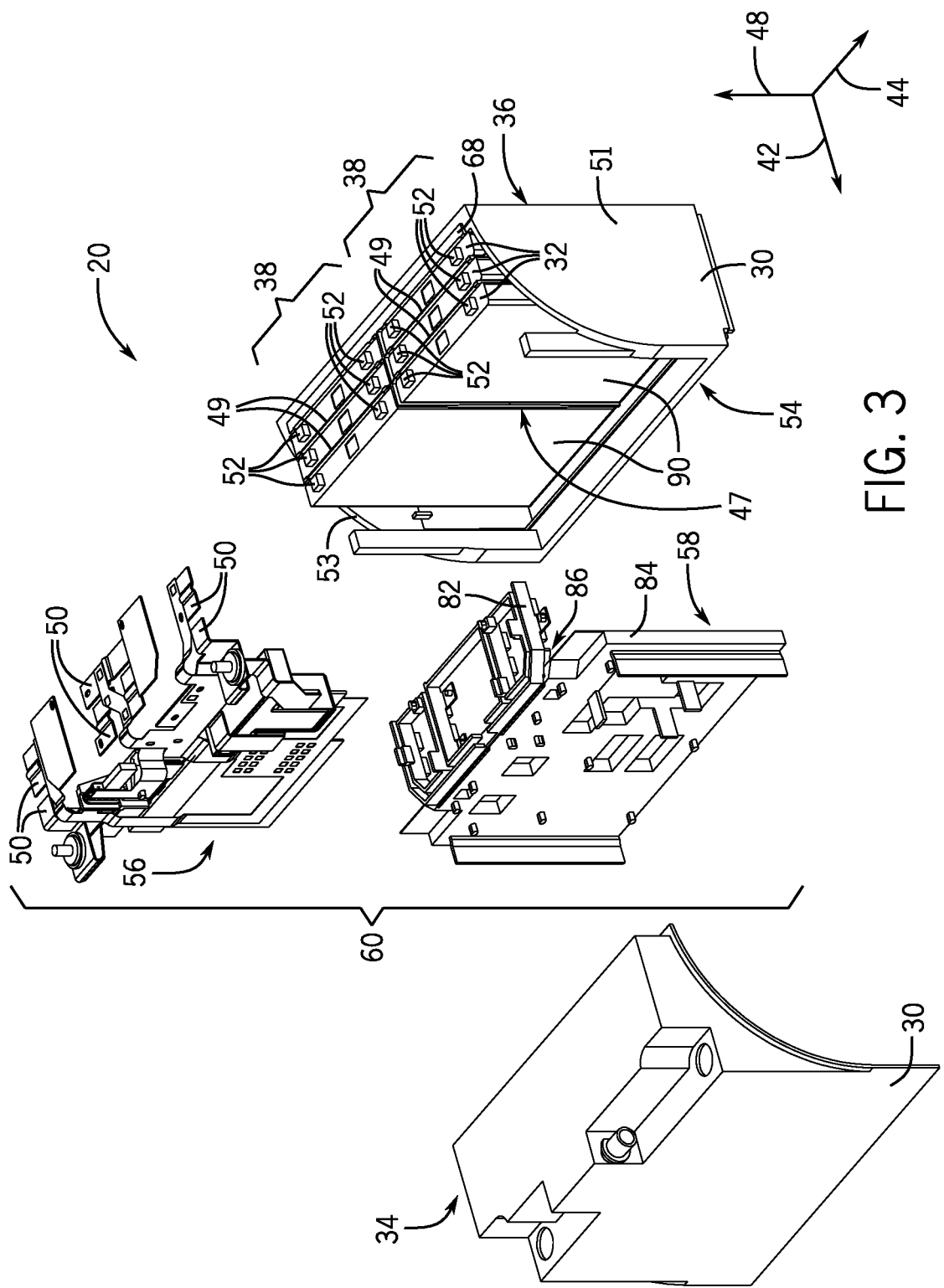
FIG. 3 is an exploded perspective view of an embodiment of a battery module for use in the battery system of FIG. 1, in accordance with an aspect of the present disclosure.

An exploded perspective view of an embodiment of the battery module 20 (e.g., lithium-ion battery module) of FIG. 2 is shown in FIG. 3. The illustrated battery module 20 is non-limiting, and embodiments in accordance with the present disclosure may include only some of the components shown in the illustrated battery module 20, only all of the components shown in the illustrated battery module 20, or additional components not shown in the illustrated battery module 20.

As shown, the battery module 20 includes a housing 30 configured to receive a number of electrochemical cells 32. For example, as shown, the housing 30 receives six electrochemical cells 32. However, in another embodiment, the housing 30 may receive 2, 3, 4, 5, 7, 8, 9, 10, 11, 12, or more electrochemical cells 32. Further, the housing 30 in the illustrated embodiment includes an upper cover 34 and a lower base 36. During manufacturing or installation, the base 36 may receive the electrochemical cells 32 and/or other components of the battery module 20, and the cover 34 may be disposed over the base 36 after the electrochemical cells 32 and/or other components are disposed therein. As shown, the base 36 may include a curved surface 37, and the cover 34 may include a corresponding curved surface 39. The curved surface 37 of the base 36 may be configured to be welded or otherwise coupled with the curved surface 39 of the cover 34. By including the curved surfaces 37, 39 on the base 36 and the cover 34, respectively, a size of the welding area (e.g., between the base 36 and the cover 34) may be increased.

However, other configurations of the housing 30 may also be possible. For example, the housing 30 may include more than two components (e.g., more than the base 36 and the cover 34). Further, in certain embodiments, the housing 30 may include only a base, and the base may be a prismatic shape configured to be closed by a separate smaller lid. For example, in such embodiments, the base may be a prismatic shape having a closed bottom and side walls extending upwardly from the closed bottom. Smaller sidewalls of the smaller lid may couple to the side walls of the prismatic base, or the smaller lid may be a prismatic wall (e.g., having no sidewalls) that couples to the side walls of the base.

As shown, the electrochemical cells 32 may be disposed in one or more stacks 38 (e.g., where the electrochemical cells 32 are stacked in a first direction 42, and the stacks 38 are disposed side-by-side in a second direction 44 perpendicular to the first direction 42) in the base 36 of the housing 30. Each stack 38 of electrochemical cells 32 may be separated from one another by a central wall 47 of the base 36 extending between adjacent stacks 38. Further, the electrochemical cells 32 of each stack 38 may be separated from one another by partitions 49 of the base 36 extending between adjacent electrochemical cells 32. For example, the partitions 49 may be coupled to, and may extend between, opposing walls of the base 36. In the illustrated embodiment, the base 36 includes a first sidewall 51 of the base 36, the central wall 47 of the base 36, and a second sidewall 53 of the base 36. The first sidewall 51, central wall 47, and the second sidewall 53 are examples of what may be referred to as partition support walls, which include walls of the base 36 that extend opposite one another, that extend generally perpendicular to a bottom wall 54 of the base 36, that extend substantially parallel to a back wall 68 of the base 36, and that support connections to partitions 49 extending there between. It should be noted that reference to the bottom wall 54 (e.g., a first external wall) and back wall 68 (e.g., a second external wall substantially perpendicular to the first external wall) suggest relative positioning and that such walls may also be referred to as external walls.

Certain of the partitions 49 extend from the first sidewall 51 to the central wall 47, and other of the partitions 49 extend from the second sidewall 53 to the central wall 47. It should be noted that other embodiments in accordance with the present disclosure may only include one stack 38 of electrochemical cells 32 and, thus, only one pair of opposing walls (e.g., the first and second sidewalls 51, 53 of the base 36). Further, it should be noted that other embodiments in accordance with the present disclosure may include more than two stacks 38 of electrochemical cells 32 and, thus, more than one central wall 47 may be included.

By positioning the electrochemical cells 32 and the corresponding stacks 38 as shown, terminals 52 of the electrochemical cells 32 may extend away from the respective electrochemical cells 32 in a single direction (e.g., a third direction 48) and may be disposed in substantially the same plane, area, or volume. In general, the electrochemical cells 32 are electrically connected with one another (e.g., in series, in parallel, or in a combination thereof) to form an interconnected network of electrochemical cells 32. The interconnected network of electrochemical cells 32 may discharge to supply a charge of the battery module 20 (e.g., to the vehicle) and may recharge to capture and store a charge (e.g., from the vehicle). In order to electrically connect the electrochemical cells 32 together, bus bars 50 (e.g., electrically conductive bars) may be utilized to electrically connect the terminals 52 (e.g., electrically conductive terminals) of adjacent electrochemical cells 32 (e.g., by spanning between, and physically contacting, the terminals 52 of the adjacent electrochemical cells 32). Depending on the configuration, the connection scheme of the bus bars 50, with respect to the battery module 20 as a whole, may differ. For example, if the battery module 20 includes only electrochemical cells 32 disposed in series, the connection scheme of the bus bars 50 may be different than if the battery module 20 includes only electrochemical cells 32 disposed in parallel. The present disclosure is intended to, and capable of, including any suitable bus bar 50 connection scheme, including a 'series' scheme, a 'parallel' scheme, or a scheme having a combination of 'series' and 'parallel' connections.

In accordance with the present disclosure, the bus bars 50 may be one type of "electrical component" utilized to electrically couple "connected components" of the battery module 20, or configured to be utilized to electrically couple "components to be connected" of the battery module 20. For example, the battery module 20 may include a group of electrical components 56 that includes the bus bars 50. The electrical components 56 may also include relay circuitry, a printed circuit board (PCB), flexible circuitry (e.g., which carries temperature/voltage sensors, signal collectors, etc.), battery module terminals (e.g., major terminals) and other components. The electrical components 56 are generally received by (e.g., mounted on) a carrier 58, where the carrier 58 and the electrical components 56 together form an electrical unit 60. The carrier 58 itself may be electrically insulative (e.g., plastic) to prevent short circuits between the electrical components 56 disposed on the carrier 58, and to impart flexibility to the carrier 58, in accordance with the present disclosure. It should be noted that the electrical components 56 may be disposed onto the carrier 58 prior to inserting the carrier 58 into the base 36, or only after inserting the carrier 58 into the base 36 in accordance with the description below.

Figure 4:
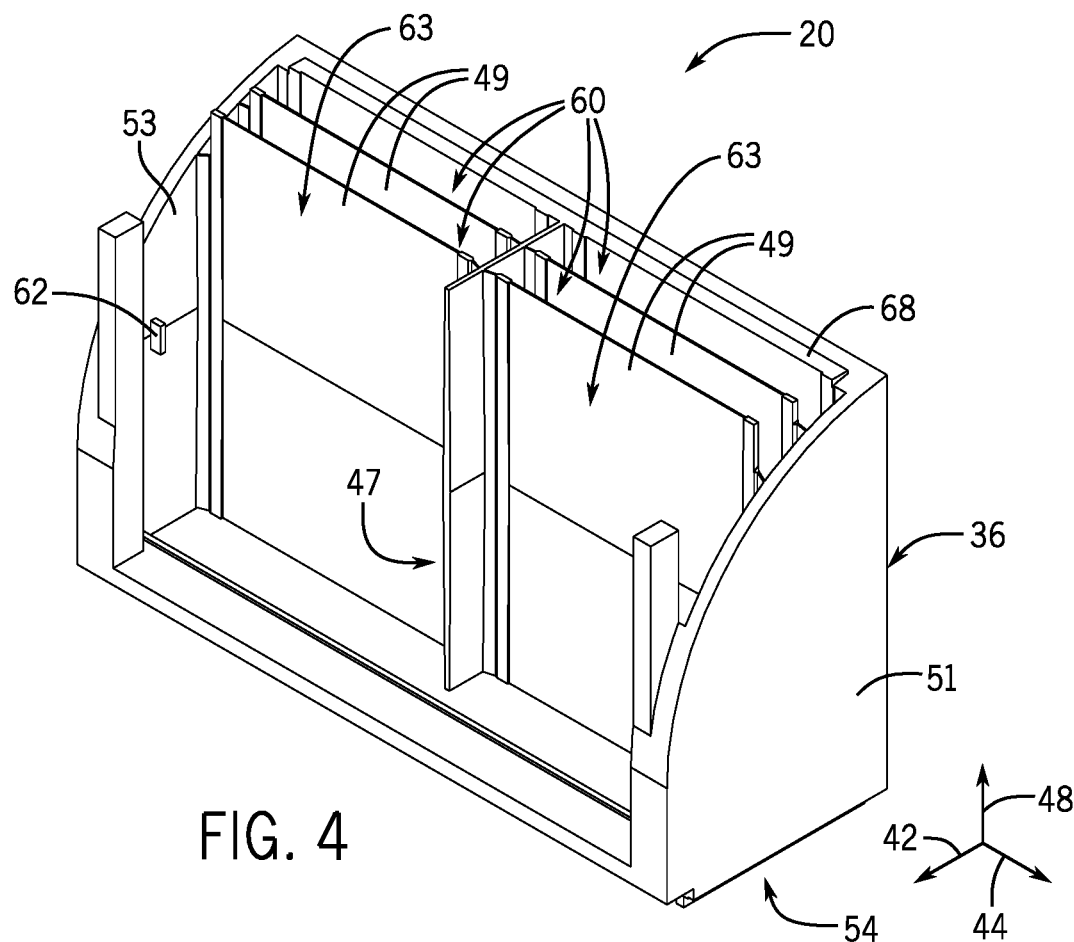
FIG. 4 is a perspective view of an embodiment of a lower base of a housing of the battery module of FIG. 3, in accordance with an aspect of the present disclosure
Figure 5:
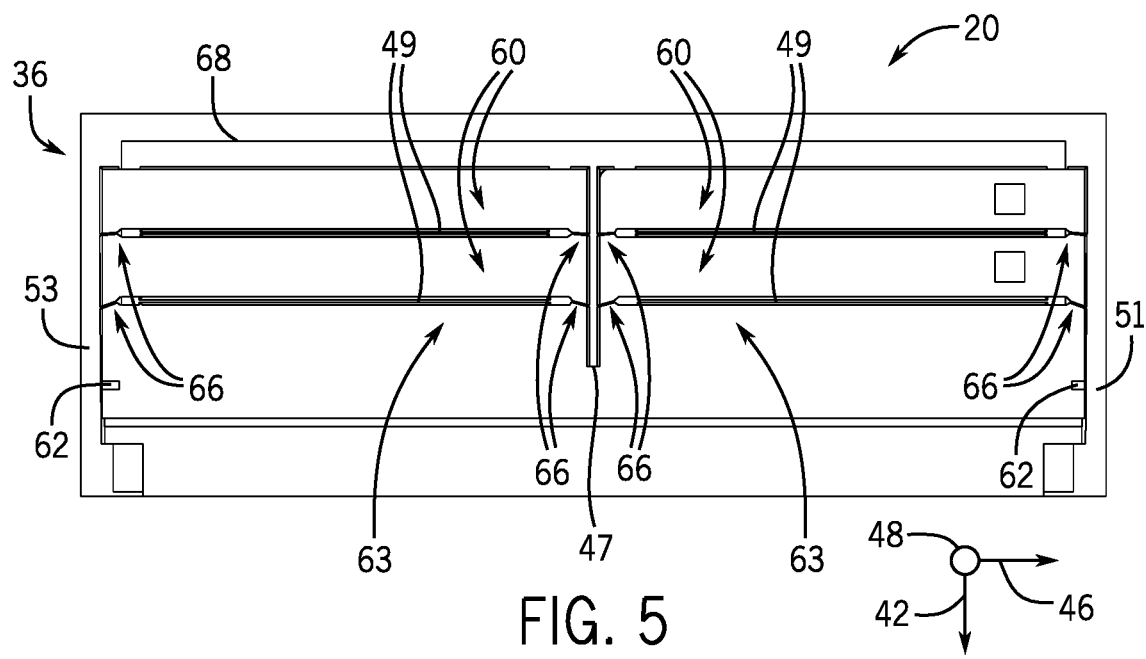
FIG. 5 is a top view of an embodiment of the lower base of FIG. 4, in accordance with an aspect of the present disclosure.

FIG. 4 is a perspective view of an embodiment of the base 36 of the housing 30 of the battery module 20 of FIG. 3. Further, FIG. 5 is a top view of an embodiment of the base 36 of FIG. 4. In the illustrated embodiment, as previously described, the base 36 includes the partitions 49 extending between opposing walls of the base 36. Namely, the base 36 includes two pairs of opposing walls, where the two pairs of opposing walls share the central wall 47. For example, the first pair of opposing walls includes the first sidewall 51 of the base 36 and the central wall 47, and the second pair of opposing walls includes the second sidewall 53 of the base 36 and the central wall 47. The base 36 includes four partitions 49, where two partitions 49 extend between the first sidewall 51 and the central wall 47, and where the other two partitions 49 extend between the second sidewall 53 and the central wall 47. The number and orientation of the partitions 49 may change per embodiment, depending on how many electrochemical cells are included, how many stacks of electrochemical cells are included, a shape of each electrochemical cell, and other factors.

As shown, the partitions 49, together with the central wall 47 and the first and second sidewalls 51, 53, define compartments 60 in which electrochemical cells are configured to be disposed. The base 36 also includes ridges 62 extending along the first and second sidewalls 51, 53, where each ridge 62, together with the corresponding partition 49 adjacent the ridge 62, defines a space 63 in which another electrochemical cell is configured to be disposed. The ridges 62 may extend along the first and second sidewalls 51, 53 a sufficient distance 64 (as shown in FIG. 4) in the direction 48 to facilitate at least partial and/or temporary retention (e.g., in the direction 42) of an electrochemical cell adjacent the ridge 62. The ridges 62 enable the at least partial and/or temporary retention of the electrochemical cell, without covering a substantial portion of the electrochemical cell. Thus, after insertion of the electrochemical cell(s) into the space(s) 63 adjacent the ridges 62, a force may be readily exerted against the electrochemical cell(s) to compress the electrochemical cell(s) (e.g., opposite to the direction 42), as described in detail below.

In accordance with embodiments of the present disclosure, the partitions 49 of the base 36 may be coupled to the central wall 47 and to the first or second sidewall 51, 53 via movable connections 66 (e.g., flexible connections, hinged connections). The movable connections 66 enable movement of the partitions 49 in the direction 42. For example, the movable connections 66 (e.g., living hinge) may be moved in the direction 42 toward a first position (e.g., open position, receiving position) that facilitates easier reception of electrochemical cells into the compartments 60 defined by the partitions 49. In other words, by moving the movable connections 66 in the direction 42 and into the first position, a size of the volume in which each electrochemical cell is received (e.g., the compartment) in the corresponding compartment 60 may be increased. It should be noted that the ridges 62 are disposed far enough from the adjacent partitions 49, along the direction 42, to facilitate reception of electrochemical cells in the spaces 63 while the adjacent partitions 49 are in the first position.

The movable connections 66 may, in some embodiments, be moved into the first position individually, one at a time, as each of the electrochemical cells is received. For example, the partitions 49 closest to a back wall 68 of the base 36 may be moved into the first position, and electrochemical cells may be disposed into the compartments 60 between the back wall 68 and the adjacent partitions 49. After the first two electrochemical cells are received, the partitions 49 nearest the back wall 68 may then be moved, about the movable connections 66, opposite to the direction 42 and toward a second position (e.g., restricting position, compressing position) opposite to the first position. The remaining two partitions 49 (e.g., the two partitions 49 nearest the ridges 62) may then be moved into the first position to increase a size of the compartments 60 disposed farther from the back wall 68 (not including the spaces 63) in the illustrated embodiment, until the electrochemical cells are received therein. The two partitions 49 nearest the ridges 62 may then be moved opposite to the direction 42 and toward the second position. Then, electrochemical cells may be received into the spaces or the compartments 60 between the ridges 62 and the adjacent partitions 49. As shown, the ridges 62 may be so positioned along the direction 42 such that the spaces 63 are large enough to receive the corresponding electrochemical cells while the adjacent partitions 49 are in the first position, in the second position, or both.

However, it should be noted that the particular order of insertion of the cells and movement of the movable connections 66 and corresponding partitions 49 may depend on the embodiment. For example, in some embodiments, all the movable connections 66 and corresponding partitions 49 may be disposed in the first position (e.g., open position, receiving position) until all the electrochemical cells are received in the compartments 60 and the spaces 63. As described in detail below with reference to later figures, the electrochemical cells may be received by the compartments 60 and the spaces 63 while the partitions 49 and the movable connections 66 are in the first position, and then another component may be introduced into the base 36 to exert a compressive force against the electrochemical cells received by the spaces 63 and the compartments 60 (and against the partitions 49), thereby forcing the movable connections 66 and corresponding partitions 49 into the second position (e.g., restricting position, compressive position). As previously described, the electrochemical cells in the spaces 63 may be temporarily retained by the ridges 62 without covering a substantial portion of the electrochemical cells, thereby enabling the force to exerted against the electrochemical cells in the spaces 63 to compress the electrochemical cells opposite to the direction 42.

Figure 6:
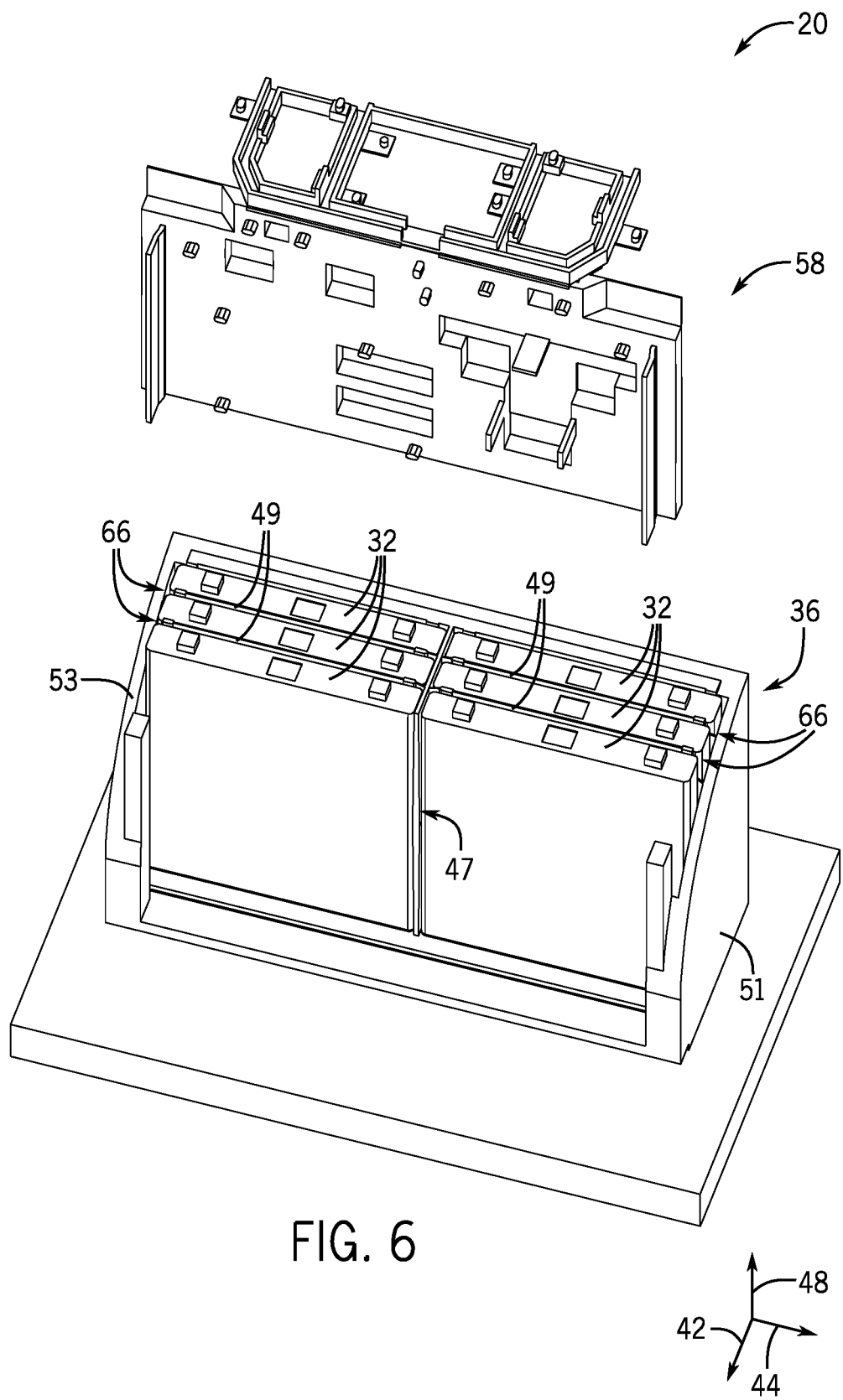
FIG. 6 is a perspective view of an embodiment of a base, electrochemical cells, and a carrier of the battery module of FIG. 3, in accordance with an aspect of the present disclosure.

For example, as shown in a perspective view of an embodiment of the base 36, the electrochemical cells 32, and the carrier 58 in FIG. 6, the carrier 58 of the battery module 20 may be configured to be disposed over the electrochemical cells 32 after the electrochemical cells 32 are received by the base 36. Depending on the embodiment, the carrier 58 may be disposed into the base 36 without electrical components disposed thereon (e.g., the electrical components may be disposed onto the carrier 58 afterwards), or the carrier 58 may be disposed into the base 36 with the electrical components disposed (e.g., pre-assembled) thereon. Further, the carrier 58 may exert a compressive force against the electrochemical cells 32 and against the intervening partitions 49 (e.g., opposite the direction 42), to retain the movable connections 66 and corresponding partitions 49 in the second position (e.g., restrictive position, compressed position). However, it should also be noted, in accordance with the description below, that the movable connections 66 of the partitions 49 may include features configured to enable fixation (e.g., setting, locking) of the movable connections 66 and corresponding partitions 49 in the second position. Thus, the movable connections 66 and corresponding partitions 49 may be at least partially set (e.g., fixed) in the second position (e.g., restricting position, compression position) prior to the carrier 58 being disposed into the base 36, or after the carrier 58 (or some other component) exerts the compressive force causing the movable connections 66 and the partitions 49 to be moved into the second position. These and other features will be described in detail below.

Figure 7:
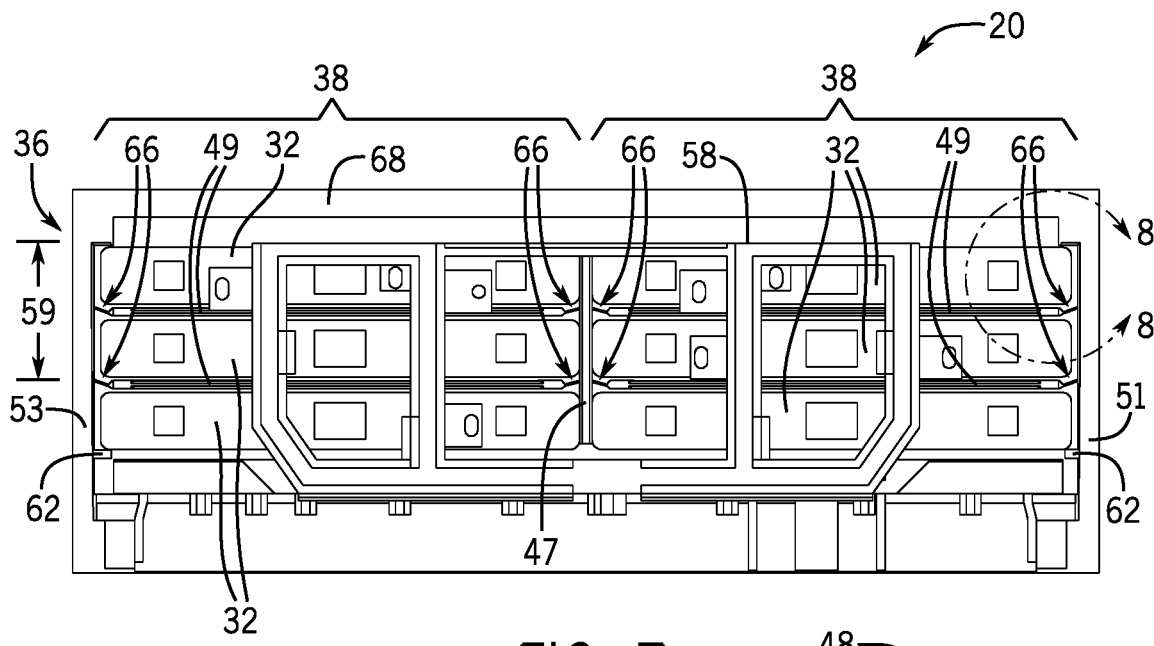
FIG. 7 is a top view of an embodiment of a portion of the battery module of FIG. 3, in accordance with an aspect of the present disclosure.
Figure 7:
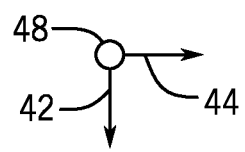

Turning now to FIG. 7, a top view of an embodiment of a portion of the battery module 20 of FIG. 3 is shown. For example, the base 36, the electrochemical cells 32 disposed in the base 36, and the carrier 58 disposed over the electrochemical cells 32 and in the base 36 are shown. The electrochemical cells 32 are illustrated as already having been received in the base 36. As shown, the movable connections 66 and the corresponding partitions 49 are in the first position (e.g., open position, receiving position). Thus, the stacks 38 of the electrochemical cells 32, and the intervening partitions 49, have not yet been compressed opposite to the direction 42. A first combined length 59 (e.g., along the direction 42) of the compartments 60 is shown, and corresponds with a first total size (e.g., first total cross-sectional area, first total volume) of the compartments 60. However, as shown, the carrier 58 is disposed over the electrochemical cells 32 and in a position to exert a force opposite to the direction 42 to compress the stacks 38 of electrochemical cells 32, and to force the movable connections 66 and the corresponding partitions 49 into the second position (e.g., restricting position, compressive position).

Figure 8:
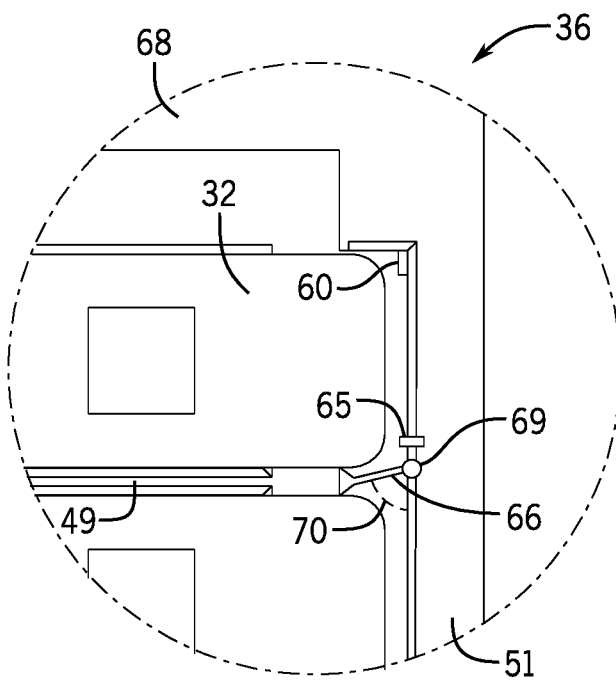
FIG. 8 is a top view of an embodiment of a portion of the battery module of FIG. 3, taken along line 8-8 in FIG. 7, in accordance with an aspect of the present disclosure.
Figure 8:
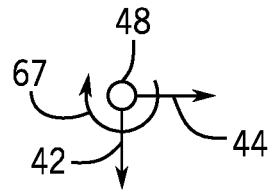

For clarity regarding the first position, an embodiment of a portion of the battery module 20 is shown in FIG. 8, taken along line 8-8 in FIG. 7. In the illustration, the movable connection 66 is shown angled acutely 70 toward the direction 42 (e.g., in the first position), to enable a larger size of the compartment 60 disposed behind the corresponding partition 49 (e.g., opposite to direction 42), thereby facilitating easier reception of the electrochemical cell 32 shown disposed in the compartment 60. As shown, the movable connection 66 may be fixed to the side wall 51 via an anchor 69. The anchor 69 may rigidly couple the movable connection 66 and corresponding partition 49 to the side wall 51, but may facilitate rotation (e.g., movement) of the movable connection 66 in an axial direction 67 (e.g., to the second position). The anchor 69, or the base 36, may also include a clip 65 (or other retention, fixing, or locking member) that the movable connection 66 may couple to (e.g., lock to, fix to) once the movable connection 66 is moved into the second position, as described below.

Figure 9:
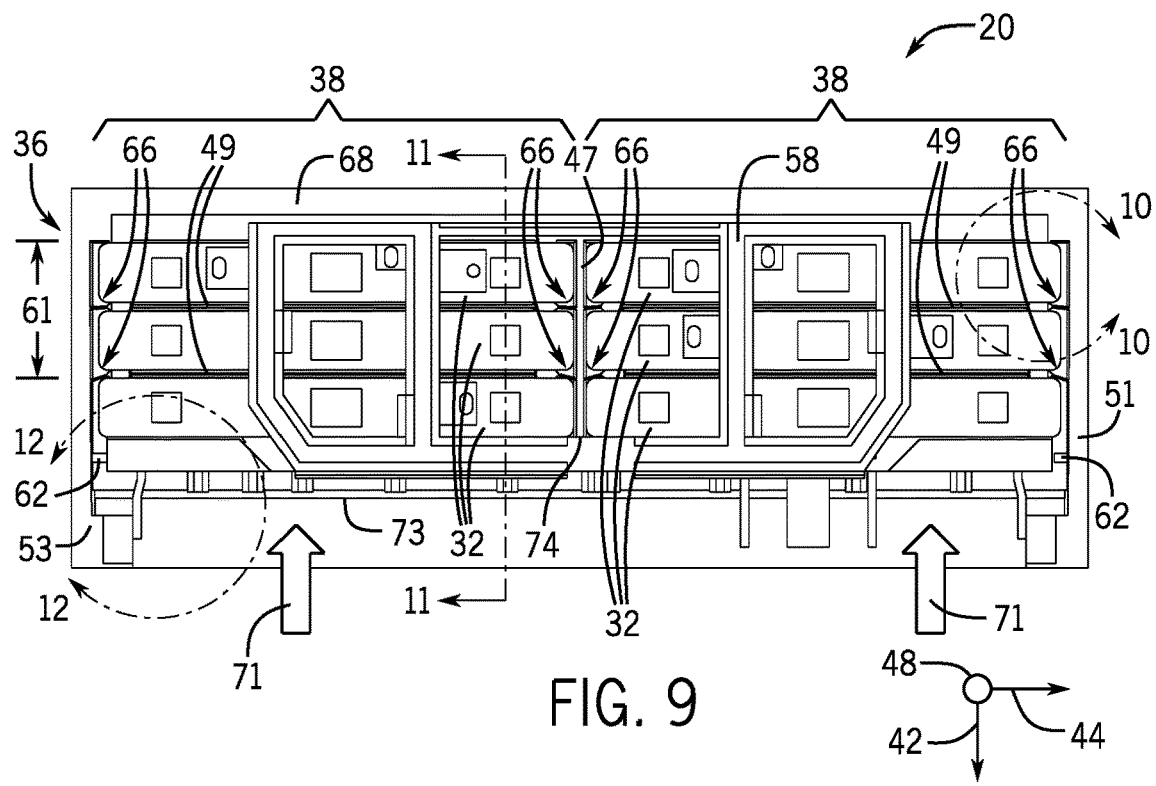
FIG. 9 is a top view of an embodiment of a portion of the battery module of FIG. 3, in accordance with an aspect of the present disclosure.

Turning now to FIG. 9, a top view of an embodiment of a portion of the battery module 20 of FIG. 3 is shown. For example, the base 36, the electrochemical cells 32 disposed in the base 36, and the carrier 58 disposed over the electrochemical cells 32 and in the base 36 are shown. The electrochemical cells 32 are illustrated as already having been received in the base 36. As shown, the movable connections 66 and corresponding partitions 49 are in the second position (e.g., restricting position, compressive position). Thus, the stacks 38 of electrochemical cells 32, and the intervening partitions 49, have been compressed opposite the direction 42. Accordingly, a second combined length 61 (e.g., along the direction 42) of the compartments 60 is shown, and corresponds with a second total size (e.g., second total cross-sectional area, second total volume) of the compartments 60. The second combined length 61 of the compartments 60 in FIG. 9 is smaller than the first combined length 59 of the compartments 60 in FIG. 7. In the embodiment illustrated in FIG. 9, a force 71 may be exerted against a face 73 of the carrier 58, where the face 73 opposes the back wall 68 of the base 36. By exerting the force 71 against the face 73 of the carrier 58, the face 73 may press into the stacks 38 of electrochemical cells 32 (and the partitions 49), forcing the movable connections 66 of the partitions 49 (and the partitions 49 themselves) into the second position (e.g., compressing position, restricting position). As shown, the force 71 against the face 73 of the carrier 58 may cause the carrier 58 to abut, or come into close proximity with, a tip 74 (e.g., distal end) of the central wall 47 of the base 36. As shown in FIG. 7, a space may be disposed between the carrier 58 and the tip 74 (e.g., distal end) of the central wall 47 prior to exerting the force 71 against the face 73 of the carrier 58. It should be noted that, in some embodiments, the force 71 may be exerted directly against the electrochemical cells 32 disposed adjacent to the face 73 of the carrier 58 (e.g., through an opening in the face 73 of the carrier 58, or prior to placing the carrier 58 into position over the electrochemical cells 23).

Figure 10:
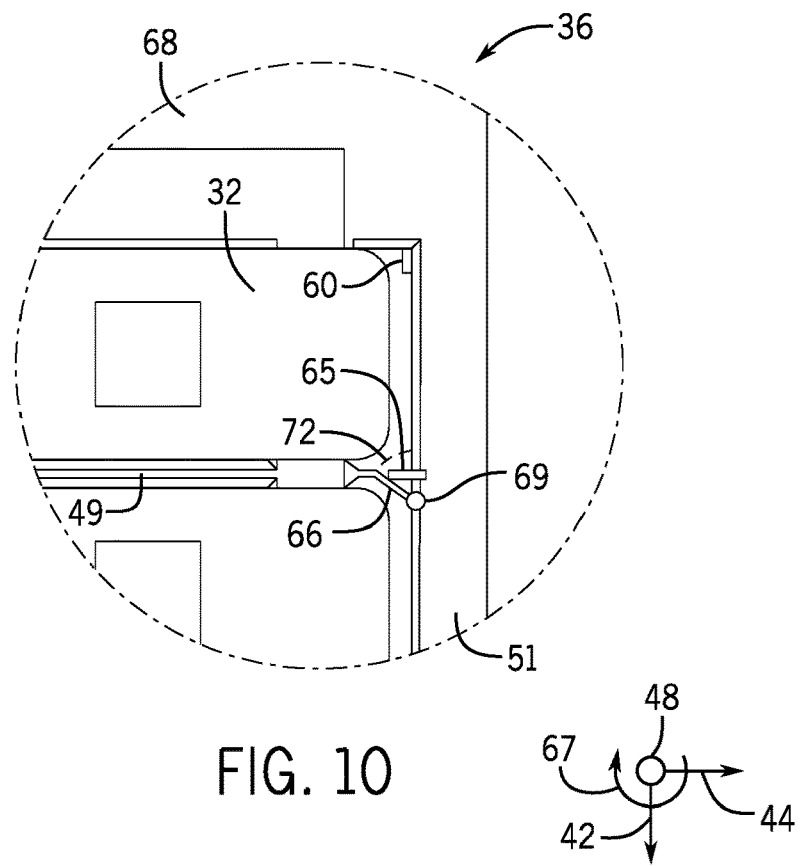
FIG. 10 is a top view of an embodiment of a portion of the battery module of FIG. 3, taken along line 10-10 in FIG. 9, in accordance with an aspect of the present disclosure.

For clarity regarding the second position (e.g., restrictive position, compressive position) of the movable connections 66 and the corresponding partitions 49, an embodiment of a portion of the battery module 20 is shown in FIG. 10, taken along line 10-10 in FIG. 9. In the illustration, the movable connection 66 is shown angled acutely 72 opposite to the direction 42 to enable restriction of a size of the compartment 60 disposed behind the corresponding partition 49 (e.g., opposite to the direction 42), thereby facilitating compression of the electrochemical cell 32 disposed in the compartment 60. It should be noted, however, that in some embodiments, the second position may include the movable connections 66 being substantially perpendicular to the walls which the movable connections 66 are coupled with (e.g., the first sidewall 51 of the base 36 in the illustrated embodiment). As shown, the movable connection 66 may be fixed to the side wall 51 via the anchor 69. The anchor 69 may rigidly couple the movable connection 66 and corresponding partition 49 to the side wall 51, but may facilitate rotation (e.g., movement) of the movable connection 66 in the annular direction 67 (e.g., to the second position). The anchor 69, or the base 36, may also include the clip 65 (or other retention, fixing, or locking member) that the movable connection 66 may couple to (e.g., lock to, fix to) once the movable connection 66 is moved into the second position. It should be noted that the illustrated anchor 69 and/or the clip 65 may be included on the illustrated side wall 51, the side wall 53 shown in FIG. 9, the central wall 74 shown in FIG. 9, and/or any combination thereof.

It should be noted that, in accordance with present embodiments, other components or features may be included in addition to, or alternative to, the anchors 69 described above to enable movement of the movable connections 66 between the first and second positions. For example, the movable connections 66 may be hinged to a bottom of the base 36. Additionally or alternatively, the movable connections 66 may include flexible material (e.g., elastic material) coupled between walls of the base 36 and the partitions 49, where the flexible material facilitates movement of the movable connections 66 and corresponding partitions 49.

Figure 11:
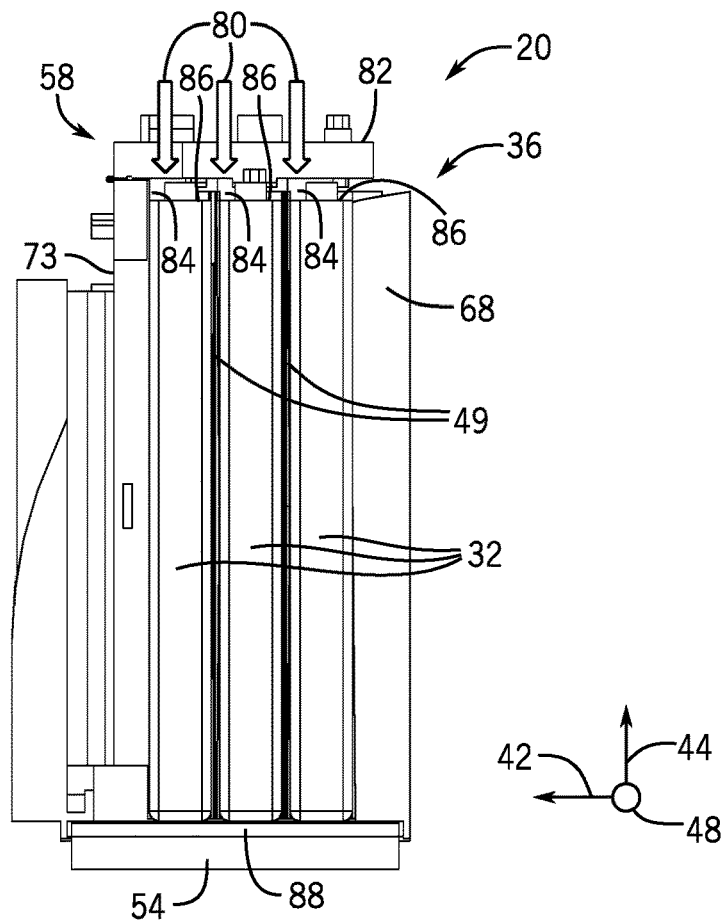
FIG. 11 is a cross-sectional side view of an embodiment of a portion of the battery module of FIG. 3, taken along line 11-11 in FIG. 9, in accordance with an aspect of the present disclosure.

Turning now to FIG. 11, a cross-sectional side view of an embodiment of a portion of the battery module 20 of FIG. 3 is shown. In the illustrated embodiment, the electrochemical cells 32 and the carrier 58 are disposed into the base 36 of the battery module 20. As previously described, the carrier 58 compresses the electrochemical cells 32 opposite to the direction 42. Further, the partitions 49 are compressed into the second position (e.g., retaining position, compressed position). As shown, the carrier 58 also compresses the electrochemical cells 32 downwardly (e.g. opposite to the direction 44). For example, a force 80 may be exerted against an upper end 82 (e.g., top end, top face) of the carrier 58 opposite to the direction 44. The carrier 58 may include extensions 84, where each extension 84 corresponds with one of the electrochemical cells 32. For example, each individual extension 84 may contact a terminal end 86 of the corresponding electrochemical cell 32. As the force 80 is exerted against the upper end 82 of the carrier 58, the extensions 84 of the carrier 58 (e.g., extending downwardly opposite to the direction 44 from the upper end 83 of the carrier 58) force the electrochemical cells 32 downwardly (e.g., opposite to the direction 44) and into a compliant thermal pad 88 disposed in the bottom wall 54 of the base 36. In some embodiments, the extensions 84 may be flexibly coupled to the upper end 82 of the carrier 58, such that the extension 84 force the electrochemical cells 32 downwardly but also flex slightly (e.g., upwardly in the direction 44) to allow for differences in heights of the electrochemical cells along the direction 44.

Figure 12:
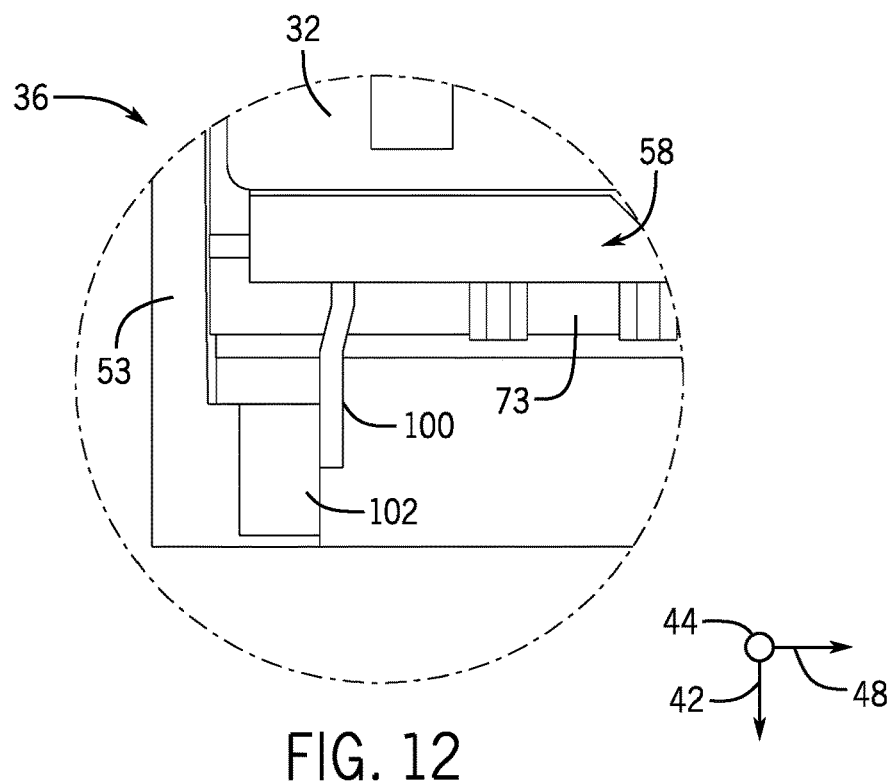
FIG. 12 is a top view of an embodiment of a portion of the battery module of FIG. 3, taken along line 12-12 in FIG. 9, in accordance with an aspect of the present disclosure.
Figure 13:
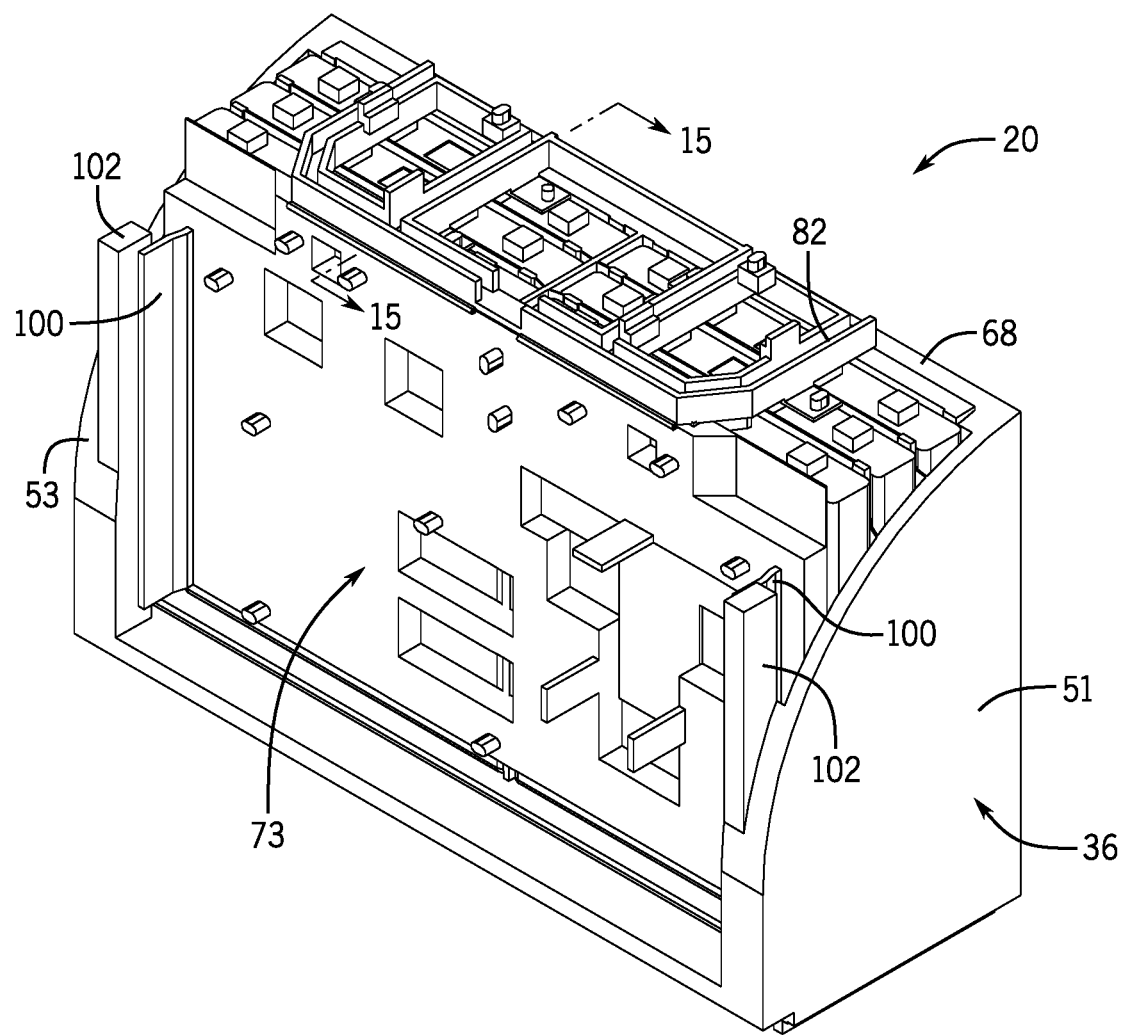
FIG. 13 is a perspective view of an embodiment of a portion of the battery module of FIG. 3, in accordance with an aspect of the present disclosure.
Figure 13:
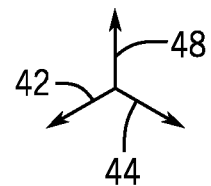

After compression of the electrochemical cells 32 opposite the direction 44 and opposite the direction 42, the carrier 58 may be welded to the base 36 to retain the carrier 58 in place and in the compressed position. For example, a top view of an embodiment of a portion of the battery module 20, taken along line 12-12 in FIG. 9, is shown in FIG. 12. Further, a perspective view of an embodiment of a portion of the battery module 20 (e.g., the base 36, the carrier 58, and the electrochemical cells 32) is shown in FIG. 13. In the illustrated embodiments, the carrier 58 comprises arms 100 extending in the direction 42, where only one of the arms 100 is shown in FIG. 12. The arms 100 are configured to abut vertical extensions 102 (e.g., vertical pillar) of the base 36, where only one of the vertical extensions 102 is shown in FIG. 12. The arms 100 may include an absorbent material and the vertical extensions 102 may include a transparent material. Thus, a laser light may pass through the arms 100 of the carrier 58, and may be absorbed by the vertical extensions 102 of the base 36, causing the vertical extensions 102 to melt and to be welded to the arms 100. As previously described, in some embodiments, the carrier 58 may be fixed at least in the direction 42 prior to welding, but still movable in the direction 44. For example, the carrier 58, the base 36, or both may include clips or other retaining features that facilitate fixation of the carrier 58 in certain directions prior to welding of the carrier 58 to the base 36. In such embodiments, the carrier 58 may be fixed in the direction 44 only after welding.

Figure 14:
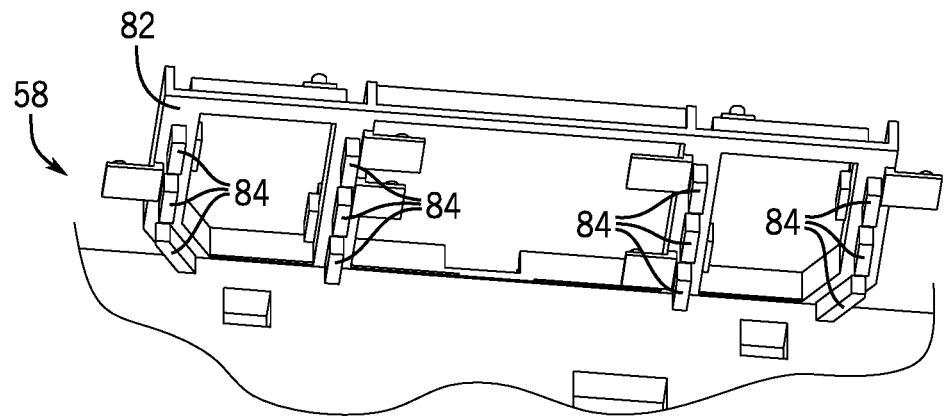
FIG. 14 is a bottom view of an embodiment of a carrier for use in the battery module of FIG. 3, in accordance with an aspect of the present disclosure.
Figure 15:
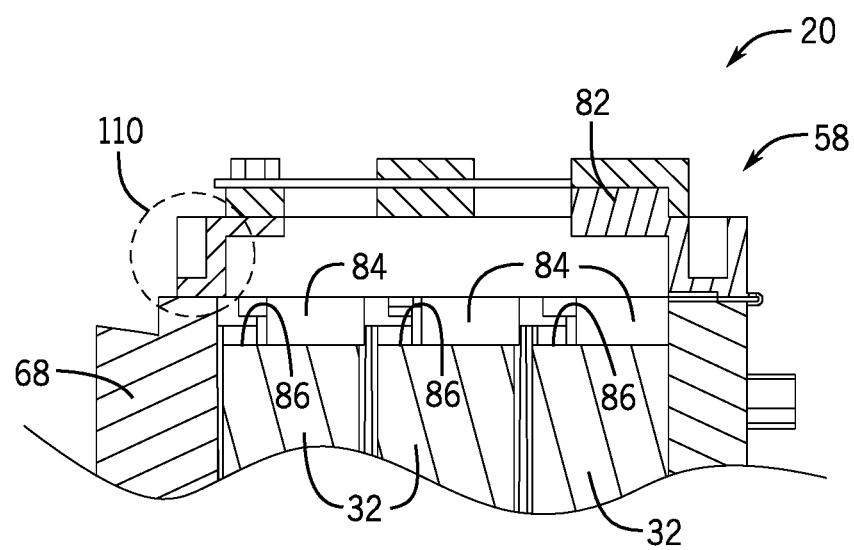
FIG. 15 is a cross-sectional side view of an embodiment of a portion of the battery module of FIG. 3, taken along line 15-15 in FIG. 13, in accordance with an aspect of the present disclosure.

The carrier 58 may also be welded to the base 36 in other areas. For example, a bottom view of an embodiment of the upper end 82 of the carrier 58 is shown in FIG. 14. Further, a cross-sectional side view of an embodiment of a portion of the battery module 20 of FIG. 3 (e.g., showing the base 36, the electrochemical cells 32, and the carrier 58), taken along line 15-15 in FIG. 13, is shown in FIG. 15. In FIG. 14, the upper end 82 of the carrier 58 includes the extensions 84 as previously described. The extensions 84 are intended to press into the terminal ends 86 of the electrochemical cells 32 shown in FIG. 15.

As previously described, the carrier 58 may mostly include a transparent material configured to enable a laser light to pass therethrough. However, the extensions 84 of the carrier 58 may be an absorbent material (which, as previously described, may be the same material as the transparent material, but with a dark layer or coating painted or otherwise applied to enable absorption). Accordingly, the extensions 84 may be melted via a laser light. As the extensions 84 melt, the carrier 58 may be pressed downwardly such that the extensions 84 comply with the terminal ends 86 of the electrochemical cells. For example, each extensions 84 may contact one electrochemical cell 32. Each extensions 84 may then harden while in contact with a corresponding one of the terminal ends 86. By facilitating melting of the extensions 84, and/or by including one extensions 84 for each individual electrochemical cell 32, the carrier 58 may provide an improved compressive force against the electrochemical cells 32 via the extensions 84. For example, each extension 84 may harden in place in contact with the corresponding terminal end 86, thereby enables unique compressive forces exerted by each extension 84 depending on height differences across the electrochemical cells 32. Further still, melting of the extensions 84 enables movement of the carrier 58 downwardly, such that surfaces of the carrier 58 may be welded to surfaces of the base 36. For example, as the carrier 58 is pushed downwardly, the upper end 82 of the carrier 58 may come into contact with an upper surface of the back wall 68 of the base 36, as shown in region 110.

Figure 16:
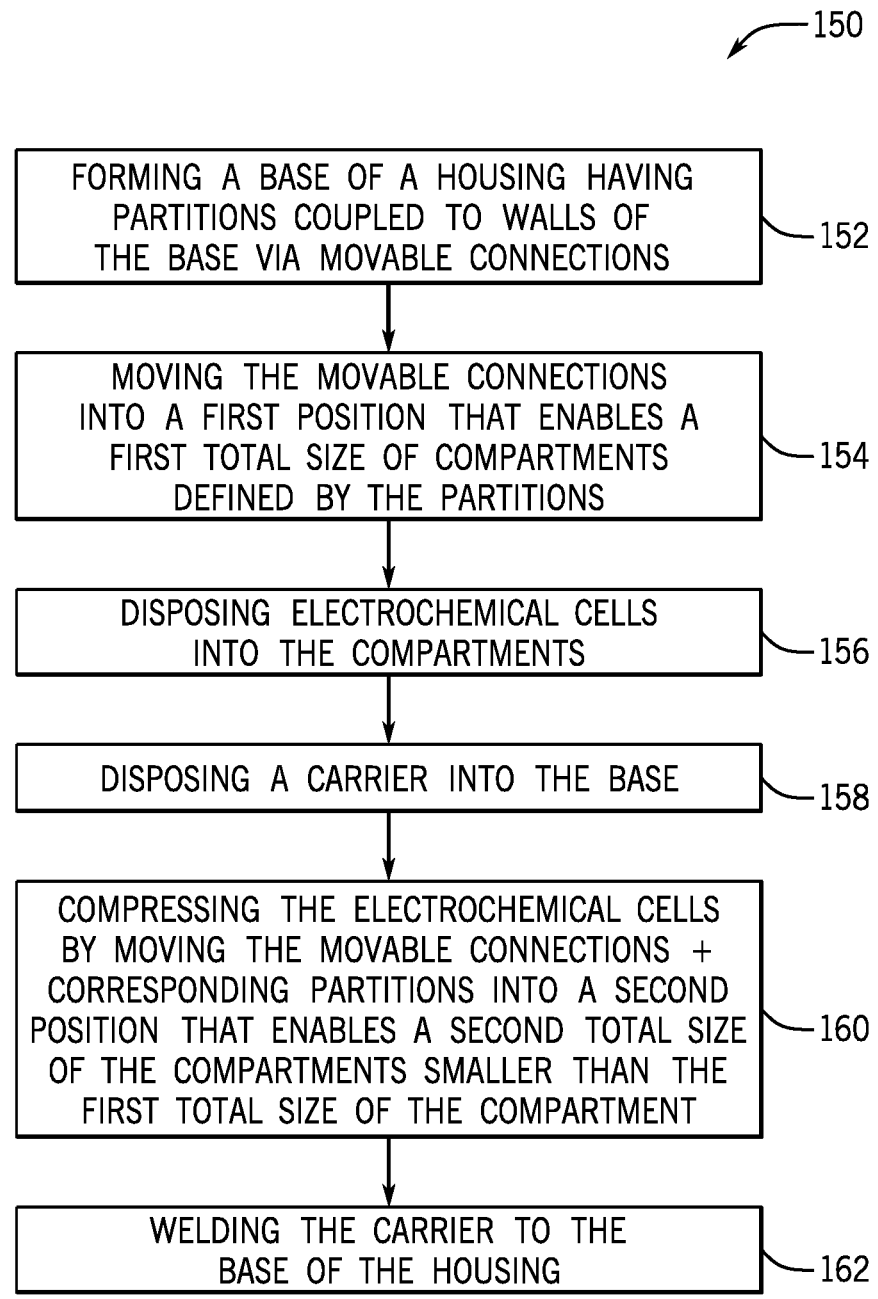
FIG. 16 is a process flow diagram illustrating an embodiment of a method of assembling the battery module of FIG. 3, in accordance with an aspect of the present disclosure.

An embodiment of a method 150 of assembling the battery module of FIG. 3 is shown in FIG. 16. In the illustrated embodiment, the method 150 includes forming (block 152) a base of a housing having partitions coupled to walls of the base via movable connections. For example, the base may include walls extending substantially parallel to one another. Two of the walls may be side walls of the base. In some embodiments, an additional central wall may be disposed between the two side walls. The partitions may extend between the two side walls of the base, and in embodiments having the central wall, the partitions may couple to the central wall. The partitions may include movable connections that couple to at least one of the two side walls and, in embodiments having the central wall, to the central wall. The partitions generally define compartments within the base of the housing.

The method 150 also includes moving (block 154) the movable connections and corresponding partitions into a first position (e.g., open position, receiving position) that facilitates a larger total volume of the compartments within the base of the housing. For example, the base may include a back wall extending between the side walls of the base and substantially parallel with the partitions of the base. The partitions may be moved in a direction away from the back wall of the base, thereby increasing a total volume of the compartments formed within the base. Thus, electrochemical cells may be more readily received by the compartments.

The method 150 also includes disposing (block 156) the electrochemical cells into the compartments. For example, the electrochemical cells may be indexed into the compartments defined by the partitions. It should be noted that, in some embodiments, one or more spaces may be formed outside of the partition(s) disposed farthest from the back wall of the base. Electrochemical cells may also be disposed in the one or more spaces and retained at least in part by ridges formed on the base of the housing.

The method 150 also includes disposing (block 158) a carrier into the base (e.g., over and/or beside the electrochemical cells), and compressing (block 160) the electrochemical cells by moving (e.g., forcing) the partitions and movable connections into a second position (e.g., restricting positon, compressing position). For example, the electrochemical cells, the partitions, and the movable connections may be forced into the second position (e.g., toward the back wall of the base) by the carrier, or by another component prior to positioning the carrier into position proximate the compressed electrochemical cells, partitions, and movable connections.

Further, the method 150 includes welding (block 162) the carrier to the base. As previously described, materials of the carrier and the base may be selected to enable welding of the carrier to the lower housing and to facilitate improved compression of the electrochemical cells. For example, the carrier may include transparent material (e.g., material through which a laser light passes without melting the material) and absorbent material (e.g., material which absorbs the laser light and melts), where the transparent and absorbent materials are strategically located throughout the carrier, as set forth below. It should be noted that, in certain embodiments, the transparent and absorbent materials may be identical or similar materials, but that the absorbent material may include a feature (e.g., a masterbatch coating or layer of dark paint or material) that facilitates absorption.

Specifically, the carrier may mostly include transparent material that enables a laser light to pass therethrough without melting the transparent material. The laser light may be absorbed by the absorbent material of the lower housing, causing the absorbent material of the lower housing to melt, which facilitates welding of the lower housing to the transparent material of the carrier. However, portions of the carrier may also include absorbent material. For example, the carrier may include extensions that extend downwardly toward, and contact, the electrochemical cells. The extensions may be made of the absorbent material (e.g., the same absorbent material as the lower base, or a different type of absorbent material). In some embodiments, as described above, the absorbent material may be an identical or similar material as the transparent material, but may include a coating or layer of dark paint or material that facilitates absorption.

By including absorbent material in the extensions, the extensions may melt while absorbing the laser light. In conjunction with a downwardly force exerted against a top of the carrier, melting of the extensions may enable the carrier to move downwardly and to come into contact with surfaces of the housing that the carrier may be welded to. Further, the extensions may melt in such a way that facilitates intimate contact between the extensions and each of the electrochemical cells, which may otherwise not be possible if the electrochemical cells include slight differences in height. The extensions may then harden and maintain intimate proximity or contact with each of the electrochemical cells, facilitating improved fixation of the electrochemical cells within the lower base of the housing.

One or more of the disclosed embodiments, alone or in combination, may provide one or more technical effects useful in the manufacture of battery modules, and portions of battery modules. In general, embodiments of the present disclosure include a battery module having a housing with a base configured to receive electrochemical cells therein. The base may include side walls and a central wall extending parallel to, and between, the side walls. Partitions may extend between the side walls and the intervening central wall to define compartments in the base. The partitions may be coupled to the side wall(s) and the central wall via movable connections. Thus, the movable connections and corresponding partitions may be moved to a first position to increase a size of the compartments, and a second position to decrease a size of the compartments. The electrochemical cells may be inserted into the compartments when the movable connections and the corresponding partitions are in the first position. The movable connections and the partitions may be moved to the second position to compress the electrochemical cells after they have been received by the compartments. Thus, the electrochemical cells may be compressed into a smaller volume, thereby enhancing an energy density of the battery module. Further, the first position of the movable connections and the partitions may facilitate reception of the electrochemical cells into the base. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module for a vehicle, comprising:
a housing comprising:
a base of the housing;
at least two opposing partition support walls of the base;
a first external wall of the base;
a second external wall of the base that is substantially perpendicular to the first external wall; and
two or more partitions extending between the at least two opposing partition support walls to define a plurality of compartments within the base;
a plurality of prismatic electrochemical cells, wherein each compartment is configured to receive a corresponding one of the plurality of electrochemical cells;
wherein each of the two or more partitions extends in alignment with the first external wall and transverse to the second external wall;
wherein each of the two or more partitions is coupled to at least one of the at least two opposing partition support walls via a corresponding movable connections configured to be movable between a first position angled away from the first external wall to facilitate access to a corresponding compartment of the plurality of compartments, and a second position angled toward the first external wall to facilitate retention of an electrochemical cell disposed within the corresponding compartment;
wherein the housing comprises a central wall extending between and substantially parallel to the at least two opposing partition support walls of the base; and
wherein each partition of the two or more partitions is coupled to the central wall via an additional corresponding of movable connections movable between the first position and the second position, such that each partition is individually movable toward the first external wall of the base; and
a carrier configured to be disposed over the plurality of electrochemical cells and to compress the plurality of electrochemical cells and the two or more partitions into a compressed state in which the corresponding connections of the two or more partitions are positioned in the second position, wherein the base comprises laser-absorbent material, which is configured to absorb laser light passing therethrough and to melt, and the carrier comprises:
a first portion having transparent material enabling laser light to pass therethrough without melting the transparent material, wherein the first portion is configured to be aligned with the base; and
extensions comprising laser-absorbent material, wherein the extensions are configured to be aligned with the plurality of electrochemical cells and to extend toward the plurality of electrochemical cells.

2. The battery module of claim 1, wherein the base comprises retention features that set or lock the two or more partitions into place in the second position.

3. The battery module of claim 2, wherein the retention features comprise clips that the corresponding movable connections interface with to set or lock the corresponding movable connections in the second position.

4. The battery module of claim 1, wherein the base comprises a ridge extending along each wall of the opposing partition support walls, and wherein each ridge is configured to at least partially define a space in which an electrochemical cell is configured to be disposed.

5. The battery module of claim 1, wherein the carrier is configured to be welded to the base to facilitate maintenance of the compressed state.

6. The battery module of claim 1, wherein the carrier, the base, or both comprise retention features that at least partially retain the carrier in the compressed state without welding the carrier to the base.

7. The battery module of claim 1, comprising a compliant thermal pad disposed in the second external wall of the base and configured to contact base ends of the plurality of electrochemical cells, wherein a top end of the carrier is configured to contact the plurality of electrochemical cells and compress the plurality of electrochemical cells downwardly into the compliant thermal pad.

8. The battery module of claim 7, wherein the top end of the carrier comprises a plurality of extensions corresponding with the plurality of electrochemical cells such that each extension of the plurality of extensions contacts only one electrochemical cell of the plurality of electrochemical cells.

9. The battery module of claim 8, wherein the plurality of extensions comprises laser-absorbent material, which is configured to absorb laser light passing therethrough and to melt.

10. A housing of a battery module, comprising:
a base, wherein the base comprises a first side wall, a second side wall opposite to the first side wall, and a central wall extending between and substantially parallel to the first side wall and the second side wall; and a plurality of partitions extending between the first side wall and the second side wall and defining a plurality of compartments within the base;

wherein each of the plurality of compartments is configured to receive a corresponding prismatic electrochemical cell of a plurality of prismatic electrochemical cells, wherein one side of each partition of the plurality of partitions is coupled to the first side wall or the second side wall via a flexible connection movable between a first position, in which a first total volume of the plurality of compartments is defined by the plurality of partitions, and a second position, in which a second total volume of the plurality of compartments is defined by the plurality of partitions, the second total volume being smaller than the first total volume, and the other side of each partition of the plurality of partitions is coupled to the central wall via an additional flexible connection movable between the first position and the second position, such that each partition is individually movable toward a back wall of the base, and wherein the base comprises a laser-absorbent material to which a carrier having transparent material is configured to be welded, wherein the laser-absorbent material is configured to absorb laser light passing therethrough and to melt and the transparent material is configured to enable laser light passing therethrough without melting the transparent material, wherein the carrier comprises a plurality of extensions configured to be aligned with the plurality of electrochemical cells, and wherein the plurality of extensions comprise the laser-absorbent material.

11. The housing of claim 10, wherein the base comprises a first ridge extending along the first side wall of the base and a second ridge extending along the second side wall of the base, wherein the first and second ridges, along with at least one partition of the plurality of partitions, at least partially define one or more spaces configured to receive a corresponding one or more electrochemical cells.

12. The housing of claim 10, wherein each flexible connection comprises one or more locking members configured to facilitate locking of the flexible connection in the second position.

13. The housing of claim 10, wherein the base comprises a plurality of locking members configured to facilitate locking of the flexible connections in the second position.

14. A method of assembling a battery module, comprising:

disposing a plurality of movable connections of a corresponding plurality of partitions of a housing of the battery module and a corresponding plurality of additional movable connections of the corresponding plurality of partitions of a housing of the battery module in a first position in which a first total size of a plurality of compartments within the housing is defined by the corresponding plurality of partitions, wherein the plurality of movable connections couple the corresponding plurality of partitions with at least one of two opposing side walls of the housing and the corresponding plurality of additional movable connections couple the corresponding plurality of partitions with a central wall of the housing extending between and substantially parallel to the at least two opposing side walls;

disposing a plurality of electrochemical cells into the plurality of compartments; and moving the plurality of movable connections of the corresponding plurality of partitions and the corresponding plurality of additional movable connections into a second position, in which a second total size of the plurality of compartments is defined by the corresponding plurality of partitions, the second total size of the plurality of compartments being smaller than the first total size of the plurality of compartments, such that each partition is individually movable toward a back wall of the housing.

* * * * *

UNITED STATES PATENT AND TRADEMARK OFFICE
CERTIFICATE OF CORRECTION

PATENT NO. : 11,075,424 B2
APPLICATION NO. : 16/081857
DATED : July 27, 2021
INVENTOR(S) : Brenner et al.

It is certified that error appears in the above-identified patent and that said Letters Patent is hereby corrected as shown below:

In the Specification

Column 1, Line 32, delete "full hybrid systems (FHEVs)" and insert -- full hybrid electric vehicles (FHEVs) --, therefor.

Column 1, Line 35, delete "mild hybrid systems (MHEVs)" and insert -- mild hybrid electric vehicles (MHEVs) --, therefor.

Column 3, Line 7, delete "DRAWINGS" and insert -- BRIEF DESCRIPTION OF DRAWINGS --, therefor.

Column 3, Line 23, delete "disclosure" and insert -- disclosure; --, therefor.

Column 14, Line 2, delete "central wall 74" and insert -- central wall 47 --, therefor.

Column 16, Line 19, delete "positon," and insert -- position, --, therefor.

Column 16, Line 23, delete "proximate the" and insert -- proximate to the --, therefor.

In the Claims

Column 18, Line 9, Claim 1 delete "of movable" and insert -- movable --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*